US010612583B2

(12) United States Patent
Jozwiak (10) Patent No.: US 10,612,583 B2
(45) Date of Patent: Apr. 7, 2020

(54) RETENTION DEVICE FOR A BALL JOINT ASSEMBLY

(71) Applicant: GM GLOBAL TECHNOLOGY OPERATIONS LLC, Detroit, MI (US)

(72) Inventor: Thomas W. Jozwiak, Southgate, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 389 days.

(21) Appl. No.: 15/471,655

(22) Filed: Mar. 28, 2017

(65) Prior Publication Data
US 2018/0283445 A1 Oct. 4, 2018

(51) Int. Cl.
*F16C 11/10* (2006.01)
*F16C 11/06* (2006.01)
*B60S 1/24* (2006.01)

(52) U.S. Cl.
CPC ............ *F16C 11/10* (2013.01); *B60S 1/24* (2013.01); *F16C 11/06* (2013.01); *F16C 11/0666* (2013.01); *F16C 2226/72* (2013.01); *F16C 2226/74* (2013.01); *F16C 2326/09* (2013.01)

(58) Field of Classification Search
CPC ...... B60S 1/24; B60S 1/06; B60S 1/16; B60S 1/245; B60S 1/18; B60S 1/40; F16C 11/06; F16C 11/10
USPC .............. 403/134; 15/250.3, 250.31, 250.27
See application file for complete search history.

(56) References Cited
U.S. PATENT DOCUMENTS

| | | | | |
|---|---|---|---|---|
| 3,216,753 A | * | 11/1965 | Oishei | B60S 1/24 15/250.27 |
| 3,441,298 A | * | 4/1969 | Herbenar | F16C 11/06 403/134 |
| 3,759,555 A | * | 9/1973 | Ito | B60S 1/24 403/122 |
| 3,853,414 A | * | 12/1974 | Hirano | F16C 11/0657 403/122 |
| 3,861,812 A | * | 1/1975 | Ito | B60S 1/24 403/141 |
| 4,266,883 A | * | 5/1981 | Riester | F16C 11/0657 403/122 |
| 4,519,123 A | * | 5/1985 | Imayoshi | B60S 1/0438 15/250.34 |
| 4,552,480 A | * | 11/1985 | McIntyre | B60S 1/24 403/134 |
| 4,628,760 A | * | 12/1986 | Huddleston | B60R 1/068 403/90 |
| 4,801,301 A | * | 1/1989 | Noiles | A61F 2/32 536/24.31 |
| 4,843,898 A | * | 7/1989 | Ishikawa | B60S 1/24 74/51 |

(Continued)

FOREIGN PATENT DOCUMENTS

DE 102013102197 A1 9/2013

*Primary Examiner* — Joshua T Kennedy
(74) *Attorney, Agent, or Firm* — Quinn IP Law (57) ABSTRACT

A ball and socket joint assembly is disclosed herein. The assembly includes a ball including a stud head and a shank, a socket including a cavity configured to receive the stud head, a retention surface, and a plurality of retention portions, and an interlocking member including a plate portion having an engagement surface that, in use, interfaces with the retention surface and the plurality of retention portions to achieve an interlocked position between the interlocking member and the socket.

14 Claims, 5 Drawing Sheets

(56) References Cited

U.S. PATENT DOCUMENTS

| | | | | |
|---|---|---|---|---|
| 4,902,157 | A * | 2/1990 | Ishikawa | B60S 1/24 277/504 |
| 5,002,419 | A * | 3/1991 | Eustache | B60S 1/24 403/114 |
| 5,067,198 | A * | 11/1991 | Ishikawa | B60S 1/24 15/250.31 |
| 5,473,955 | A * | 12/1995 | Stinson | B60S 1/24 15/250.27 |
| 5,680,792 | A * | 10/1997 | Buhl | B60S 1/24 15/250.31 |
| 6,145,181 | A * | 11/2000 | Murata | F16C 11/0657 277/635 |
| 6,422,102 | B1 * | 7/2002 | Kuehbauch | B60S 1/245 15/250.3 |
| 6,516,664 | B2 * | 2/2003 | Lynam | B60R 1/04 73/170.17 |
| 7,744,344 | B2 * | 6/2010 | Hillier | F01D 9/06 415/209.3 |
| 8,359,702 | B2 * | 1/2013 | Powell, Jr. | B60S 1/24 15/250.27 |
| 8,584,303 | B2 * | 11/2013 | Wolfgarten | B60S 1/3409 15/250.23 |
| 9,140,294 | B2 | 9/2015 | Burton | |
| 9,291,194 | B2 * | 3/2016 | Strobel | E05F 15/622 |
| 2011/0067198 | A1 * | 3/2011 | Powell, Jr. | B60S 1/24 15/250.34 |
| 2013/0121754 | A1 * | 5/2013 | Kuroda | F16C 11/0623 403/122 |
| 2014/0020272 | A1 * | 1/2014 | Gold | G09F 21/048 40/590 |
| 2014/0376991 | A1 * | 12/2014 | Strobel | E05F 15/622 403/133 |
| 2019/0048922 | A1 * | 2/2019 | Sugg | F16C 11/0633 |

* cited by examiner

RETENTION DEVICE FOR A BALL JOINT ASSEMBLY

INTRODUCTION

The present invention relates generally to a retention device for a ball joint assembly.

A ball joint or ball and socket joint consists of a bearing or ball stud and socket enclosed in a casing. A protective casing prevents dirt from getting into the joint assembly. Usually, this is a rubber-like boot that allows movement and expansion of lubricant. However, under some conditions, the casing does not prevent separation of the ball from the socket.

SUMMARY

Embodiments according to the present disclosure provide a number of advantages. For example, embodiments according to the present disclosure enable improved retention of a socket on a ball in a ball and socket joint connection for applications such as windshield wiper assemblies, for example and without limitation. Embodiments according to the present disclosure provide improved ball and socket retention using a sealing member having a snap or twist connection that does not increase the number of parts and reduces manufacturing complexity.

In one aspect, a windshield wiper assembly includes a first link, a second link, and a ball and socket joint assembly connecting the first link and the second link. In some aspects, the joint assembly includes a ball comprising a stud head and a shank, a socket including a cavity configured to receive the stud head, a retention surface, and a plurality of retention portions, and a sealing member including a plate portion having at least one engagement surface that, in use, interfaces with the retention surface and the plurality of retention portions to achieve an interlocked position between the sealing member and the socket.

In some aspects, the at least one engagement surface extends around the entire periphery of the sealing member.

In some aspects, the sealing member further includes a first sealing surface defining an open space, the first sealing surface configured to interface with the ball.

In some aspects, the sealing member further includes a second sealing surface configured to interface with the retention surface of the socket.

In some aspects, the first sealing surface defines a first plane and the second sealing surface defines a second plane substantially parallel to the first plane.

In some aspects, the plurality of retention portions is a plurality of retention tabs.

In another aspect, a ball and socket joint assembly includes a ball including a stud head and a shank, a socket including a cavity configured to receive the stud head, a retention surface, and a plurality of retention portions, and an interlocking member including a plate portion having an engagement surface that, in use, interfaces with the retention surface and the plurality of retention portions to achieve an interlocked position between the interlocking member and the socket.

In some aspects, the interlocking member is a sealing member.

In some aspects, each of the retention portions is a retention tab having a lip that extends over the retention surface.

In some aspects, the engagement surface extends at least partially around a periphery of the interlocking member.

In some aspects, the sealing member includes a first sealing surface defining an open space, the first sealing surface configured to interface with the ball.

In some aspects, the sealing member includes a second sealing surface configured to interface with the retention surface of the socket.

In some aspects, the interlocking member includes at least one interlocking portion.

In some aspects, the interlocking portion includes an interference surface and a ramped surface.

In some aspects, the interlocked position is achieved by rotation of the interlocking member with respect to the socket.

In some aspects, the interlocking member includes a first interlocking surface and a second interlocking surface, both of the first and second interlocking surfaces at least partially surrounding a sealing surface, the first interlocking surface being located substantially in a first plane and the second interlocking surface having at least a portion that extends substantially perpendicular to the first interlocking surface.

In some aspects, the interlocking member further includes a plurality of notches in the engagement surface.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front" "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first" "second," "third," and so on may be used to describe separate components. Such terminology may include the words specifically mentioned above, derivatives thereof, and words of similar import.

In some embodiments including a ball and socket connection, such as, for example and without limitation, windshield wiper assemblies, the socket may pop off or become dislodged from the ball of the ball and socket connection. The disconnection between the ball and socket may lead to a decrease in functionality of the windshield wiper which may decrease visibility through the windshield. Embodiments disclosed herein present an improved sealing member for a ball and socket connection to improve retention between the ball and the socket and reduce incidences of unintentional disconnection between the ball and the socket.

Figure 1:
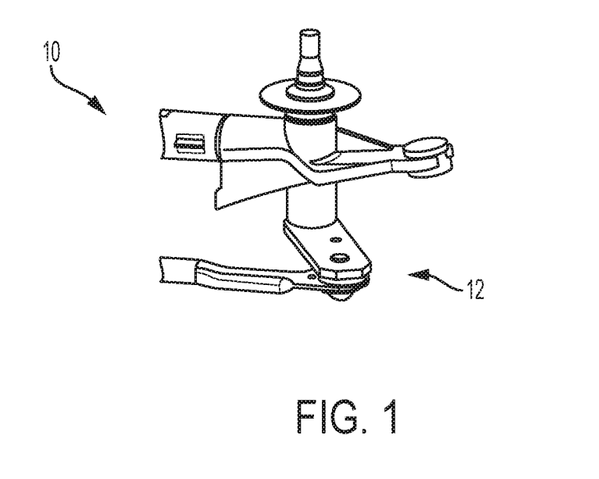
FIG. 1 is a schematic diagram of a wiper assembly having a ball and socket joint assembly, according to an embodiment.
Figure 2:
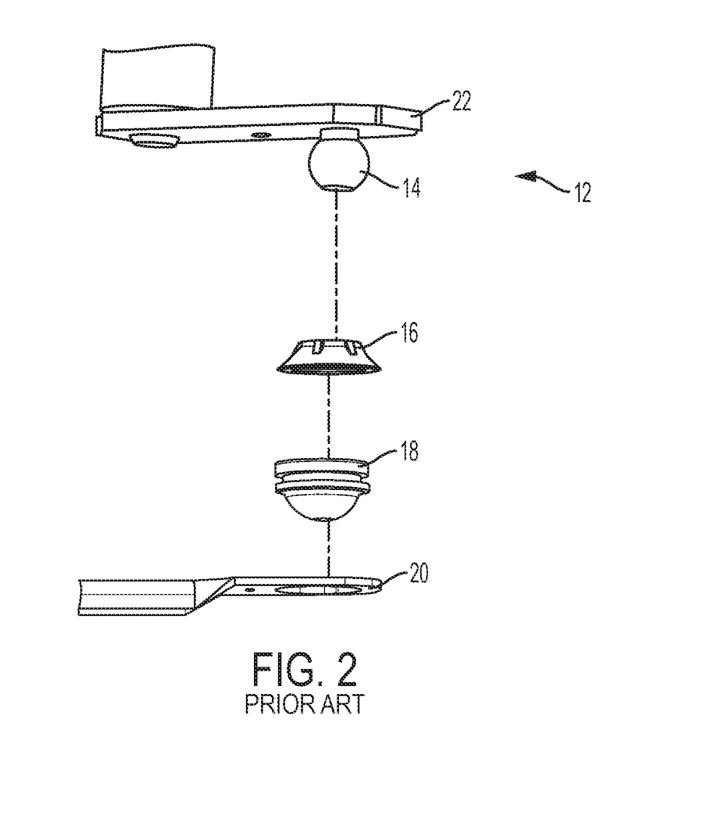
FIG. 2 is a schematic exploded view of a prior art ball and socket joint assembly.

FIG. 1 illustrates a partial view of a windshield wiper module assembly 10, according to an embodiment. The wiper module assembly 10 includes a ball and socket joint assembly 12. FIG. 2 illustrates an exploded view of a ball socket joint assembly 12 according to the prior art. In some embodiments, the joint assembly 12 includes a ball or stud head 14, a flexible sealing member or seal 16, a socket 18, and a first link 20. In some embodiments, the ball 14 is connected to a second link 22 such that the ball and socket joint assembly 12 connects the first link 20 and the second link 22. Under some conditions, such as when water washes out a lubricant from between the ball and socket of the joint assembly 12, the socket may become dislodged or pop off from the ball, resulting in reduced functionality of the wiper assembly 10. Throughout the following detailed description, like or similar reference numbers refer to like or similar components.

Figure 3:
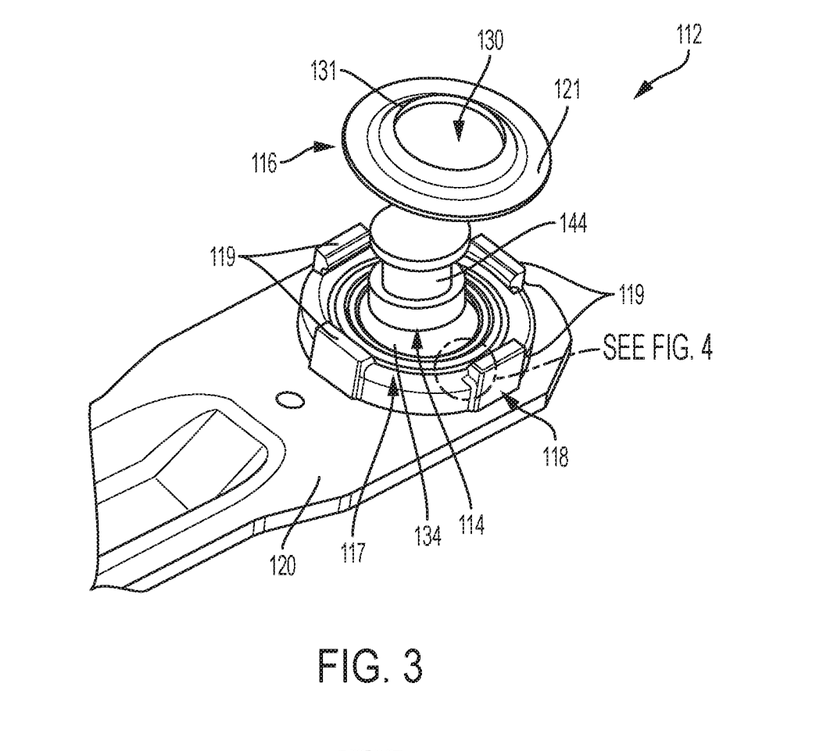
FIG. 3 is a schematic partially-exploded view of a ball and socket joint assembly, according to an embodiment.

FIG. 3 illustrates a ball socket joint assembly 112 that includes a sealing member 116 configured to retain the ball and socket connection. In some embodiments, the joint assembly 112 includes a ball 114 having a stud head 134 and a shank 144. The stud head 134 of the ball 114 fits within a cavity of a socket 118. In some embodiments, the socket 118 is coupled to a link 120. In some embodiments, for example and without limitation, the link 120 is a link of a windshield wiper assembly.

Figure 4:
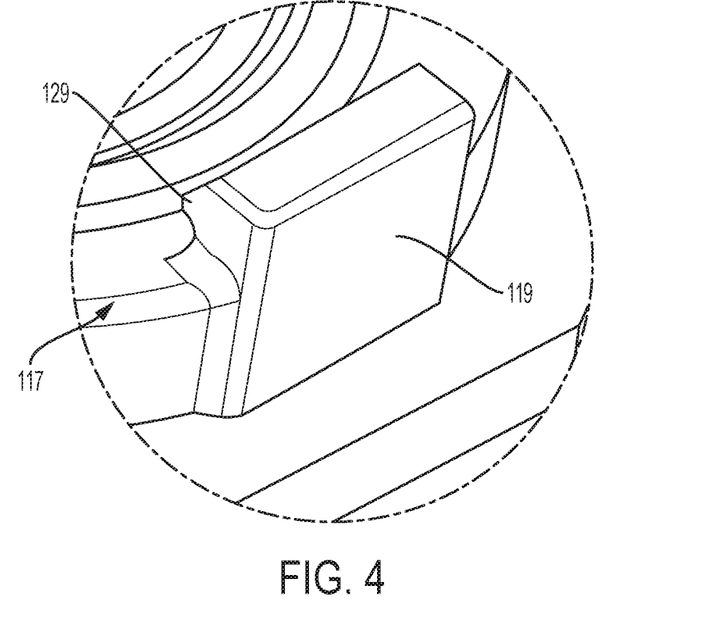
FIG. 4 is an enlarged view of area A of the socket of the ball and socket joint assembly shown in FIG. 3.

The socket 118 includes a retention surface 117 and a plurality of retention portions or retention tabs 119. FIG. 3 illustrates four (4) retention portions or tabs 119, however, other embodiments could have more or fewer retention portions 119. As shown in FIG. 4, each retention tab 119 includes a lip 129 that extends over the retention surface 117. An edge of the sealing member 116 fits within the gap between the retention surface 117 and the lip 129.

With continued reference to FIG. 3, the sealing member 116 includes plate portion having at least one engagement surface 121. The engagement surface 121 extends around at least a portion of the periphery of the sealing member 116. In some embodiments, as shown in FIG. 3, the engagement surface 121 extends around the entire periphery of the sealing member 116. The sealing member 116 also includes an interior edge 131 that defines an opening 130. In some embodiments, the interior edge 131 is on a different plane than the engagement surface 121 and is separated from the engagement surface 121 by a ramped surface.

Figure 5:
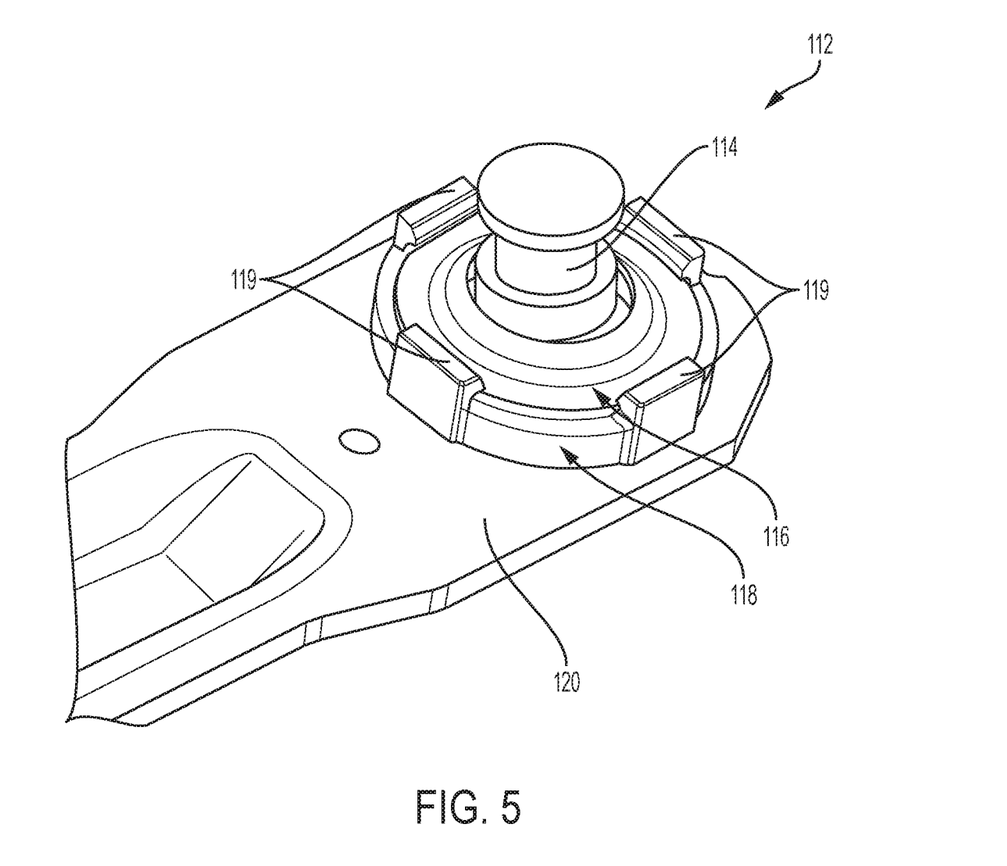
FIG. 5 is a schematic diagram of the ball and socket joint assembly of FIG. 3.

To assemble the ball and socket joint assembly 112, as shown in FIG. 5, the ball 114 is inserted into the socket 118. The sealing member 116 is placed over the ball 114 such that the shank 144 of the ball 114 extends through the opening 130. In some embodiments, the sealing member 116 includes a curved surface extending from the engagement surface 121 to the interior edge 131 such that the sealing member 116 fits securely over the stud head 134. Applying pressure to the sealing member 116 allows the engagement surface 121 to push the retention portions 119 outward from a first or unstressed position to seat the engagement surface 121 on the retention surface 117. Once the engagement surface 121 is seated on the retention surface 117, the retention portions 119 return to the first position such that the lips 129 extend over at least a portion of the engagement surface 121 to hold the sealing member 116 in place against the retention surface 117 of the socket 118.

Figure 6:
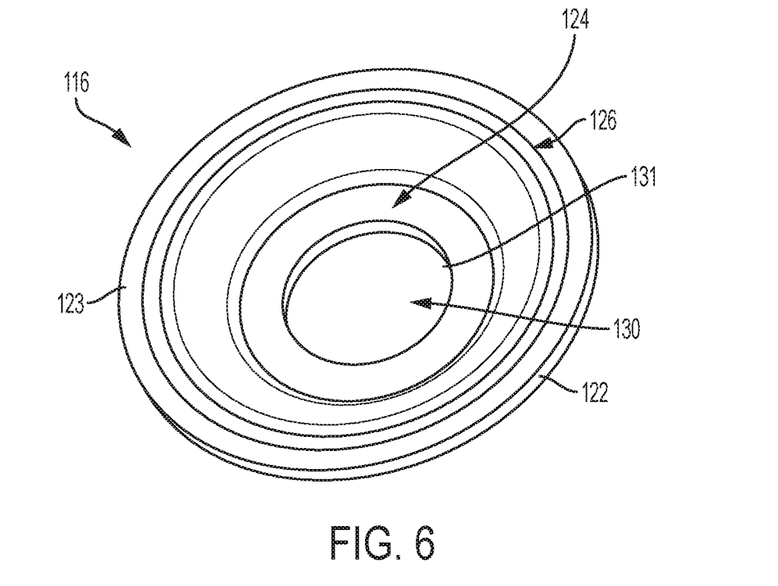
FIG. 6 is a schematic underside view of a sealing member of the ball and socket joint assembly of FIG. 3, according to an embodiment.

With reference to FIG. 6, the sealing member 116 includes an exterior edge 122 that separates the engagement surface 121 from an underside surface 123. In some embodiments, the underside surface 123 of the sealing member 116 includes a plurality of sealing surfaces 124, 126. In some embodiments, a sealing surface, such as the sealing surface 124, is adjacent to the interior edge 131. In some embodiments, the sealing surface 124 extends at least partially along the interior edge 131. In some embodiments, as shown in FIG. 6, the sealing surface 124 forms a ring adjacent to the interior edge 131. In some embodiments, the sealing surface 124 is adjacent to the stud head 134 of the ball 114. In some embodiments, the sealing surface 124 defines an open space through which the shank of the ball extends.

In some embodiments, a sealing surface, such as the sealing surface 126 shown in FIG. 6, forms a ring extending along the underside of the engagement surface 121. In some embodiments, the sealing surface 126 covers at least a portion of the underside surface 123. In some embodiments, the sealing surface 126 is a ring having a thickness less than a thickness of the sealing surface 124. In some embodiments, the sealing surface 126 engages with the retention surface 117 of the socket 118 when the sealing member 116 is coupled to the socket 118. In some embodiments, the sealing surface 124 defines a first plane and the second sealing surface 126 defines a second plane substantially parallel to and separate from the first plane.

Figure 7:
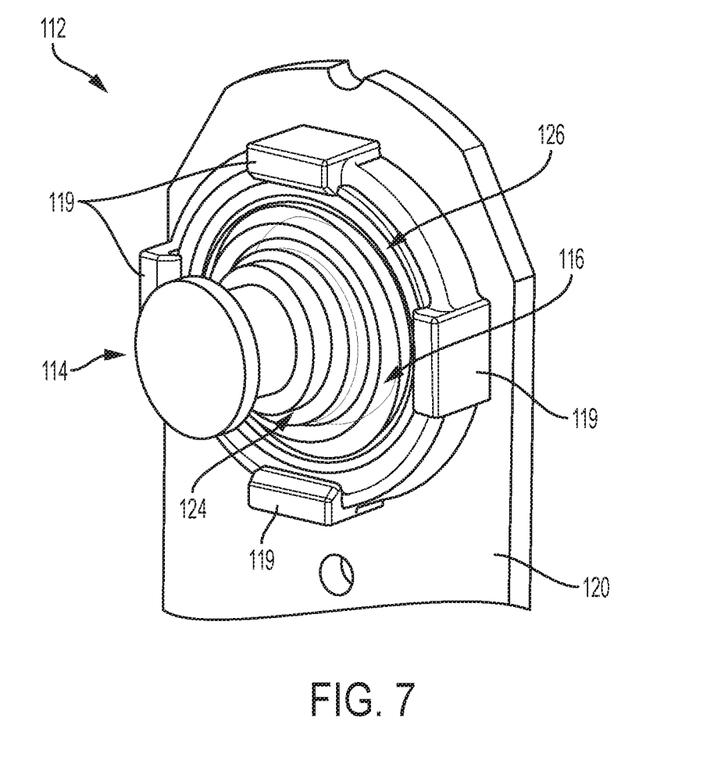
FIG. 7 is a schematic diagram of the ball and socket joint assembly of FIG. 3, with the sealing member shown in phantom.

FIG. 7 illustrates the ball and socket joint assembly 112 with the sealing member 116 shown in phantom to better illustrate the sealing surfaces 124, 126. As discussed, the sealing surface 124 extends along the interior edge of the sealing member 116 such that the sealing surface 124 engages with a portion of the ball 114. The sealing surface 126 extends in a ring proximate to the perimeter edge 122 of the sealing member 116 such that the sealing surface 126 mates against or engages with the retention surface 117 of the socket 118.

In some embodiments, the sealing member 116 is formed from a rigid material, such as, for example and without limitation, steel or rigid plastic. In some embodiments, the sealing member 116 includes integrated sealing surfaces 124, 126 formed from a flexible material, such as, for example and without limitation, a rubber or flexible plastic material. In some embodiments, the socket 118 is formed from a plastic material, for example and without limitation.

Figure 8:
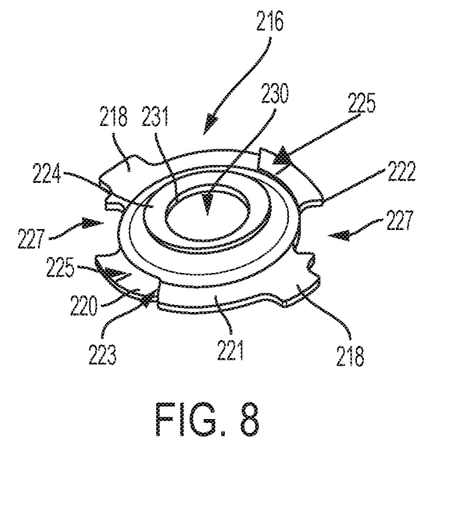
FIG. 8 is a sealing member for a ball and socket joint assembly, according to an embodiment.
Figure 9:
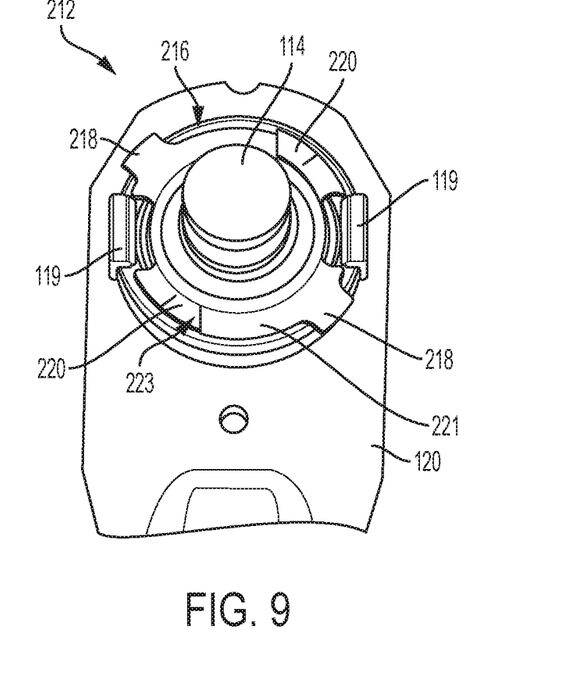
FIG. 9 is a schematic diagram of a ball and socket joint assembly in an unlocked position, according to an embodiment.
Figure 10:
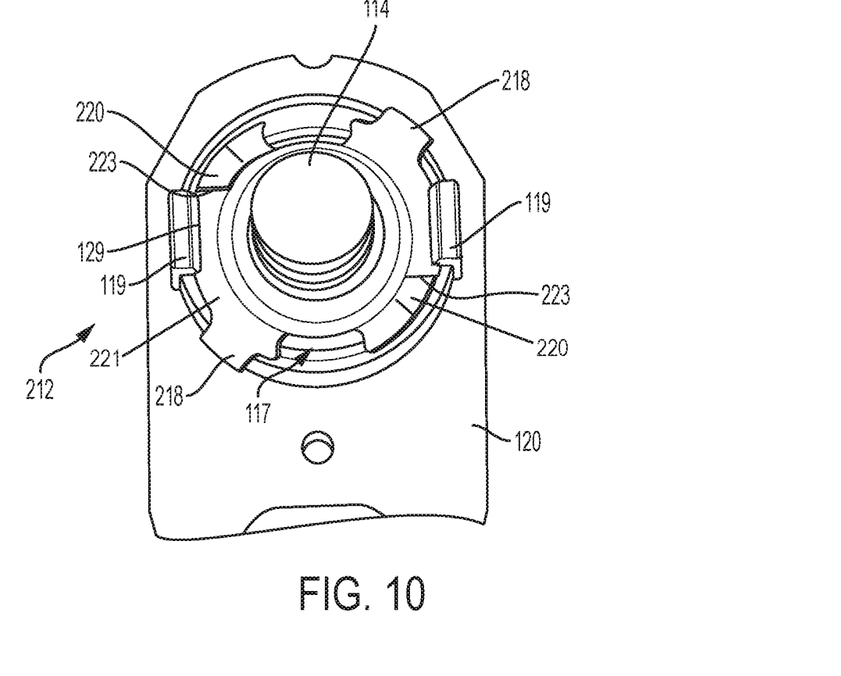
FIG. 10 is a schematic diagram of the ball and socket joint assembly of FIG. 9 in a locked position, according to an embodiment.

FIGS. 8-10 illustrate a ball and socket joint assembly 212 that includes a sealing member or interlocking member 216 configured to retain the ball and socket connection. In some embodiments, the joint assembly 212 includes a ball 114 having a stud head 134 and a shank 144. The stud head 134 of the ball 114 fits within a socket 118. In some embodiments, the socket 118 is coupled to a link 120. In some embodiments, for example and without limitation, the link 120 is a link of a windshield wiper assembly.

FIG. 8 illustrates the sealing member 216, according to an embodiment. The sealing member 216 includes an interlocking or engagement surface 221. The engagement surface 221 extends around at least a portion of the periphery of the sealing member 216. In some embodiments, as shown in FIG. 8, the engagement surface 221 extends partially around the periphery of the sealing member 116. In some embodiments, an exterior edge 222 of the engagement surface 221 defines one or more openings or notches 227 in the engagement surface 221 such that the engagement surface 221 is not a continuous ring.

In some embodiments, the sealing member 216 also includes a plurality of tabs 218. FIG. 8 illustrates a sealing member 216 having two (2) tabs; however, other embodiments could have more or fewer tabs 218. The tabs 218 form part of the engagement surface 221 and, in some embodiments, extend beyond the circumference of a majority of the sealing member 216. In some embodiments, each tab 218 is adjacent to one of the openings 227.

The engagement surface 221 also includes a plurality of interlocking portions 220. The sealing member 216 of FIG. 8 includes two (2) interlocking portions 220; however, other embodiments could include more or fewer interlocking portions 220. In some embodiments, each of the interlocking portions 220 includes a ramped surface 225 and an interlocking or radially extending interference surface 223. The ramped surface 225 defines a plane that is offset from the plane of the engagement surface 221. The radially extending interference surface 223 connects the edge of the ramped surface 225 with the engagement surface 221. In some embodiments, the interference surface 223 is perpendicular or substantially perpendicular to the engagement surface 221.

With reference again to FIG. 8, the sealing member 216 also includes an interior edge 231 that defines an opening 230. In some embodiments, the interior edge 231 is on a different plane than the engagement surface 221. In some embodiments, a sealing surface, such as the sealing surface 224, is adjacent to the interior edge 231. In some embodiments, the sealing surface 224 extends at least partially along the interior edge 231. In some embodiments, as shown in FIG. 8, the sealing surface 224 forms a ring adjacent to the interior edge 231. In some embodiments, the sealing surface 224 is adjacent to the stud head 134 of the ball 114, as shown in FIG. 9.

Similar to the joint assembly shown in FIG. 3, the socket 118 illustrated in FIG. 9 includes a retention surface 117 and a plurality of retention portions or retention tabs 119. FIG. 9 illustrates two (2) retention portions or tabs 119, however, other embodiments could have more or fewer retention portions 119. Similar to the retention portion illustrated in FIG. 4, each retention tab 119 includes a lip 129 that extends over the retention surface 117.

To assemble the ball and socket joint assembly 212, as shown in FIGS. 9 and 10, the ball 114 is inserted into the socket 118. FIG. 9 illustrates the ball and socket joint assembly 212 with the sealing member 216 in an unlocked position. FIG. 10 illustrates the ball and socket joint assembly 212 with the sealing member 216 in a locked position. As shown in FIG. 9, the sealing member 216 is placed over the ball 114 such that the shank 144 of the ball 114 extends through the opening 230. In some embodiments, the sealing member 216 includes a curved surface extending from the engagement surface 221 to the interior edge 231 such that the sealing member 216 fits securely over the stud head 134.

The sealing member 216 and the socket 118 include complementary interference features that locate the sealing member 216 and the socket 118 relative to one another in a rotational direction and inhibit or prevent the relative rotation of the sealing member 216 and the socket 118. The sealing member 216 is placed over the ball 114 such that the openings 227 are aligned with the retention tabs 119, as shown in FIG. 9. In FIG. 9, the sealing member 216 is in an unlocked position since no portion of the engagement surface 221 is engaged with the retention tabs 219. In some embodiments, the tabs 218 are located clockwise from the openings 227. The tabs 218 are used to help align the sealing member 216 with the retention tabs 119 of the socket 218 and to provide a gripping surface used to rotate the sealing member 216 into the locked position, shown in FIG. 10.

In FIG. 10, the sealing member 216 is rotated clockwise such that at least a portion of the engagement surface 221 is engaged with a lip of the retention tabs 119, as shown in FIG. 5 and discussed herein. As the sealing member 16 is rotated clockwise, the interlocking portion 220 passes underneath the lip 129. The ramped surface 225 passes underneath the lip 129 of the retention tab 119 as the sealing member 216 continues a clockwise rotation. Due to the inclination of the ramped surface 225, the retention tab 119 is pushed outward and/or upward from a first or unstressed position. After the interference surface 223 passes underneath the lip 129, the interference surface 223 is located clockwise of the edge of the retention tab 119. The retention tab 119 returns to the first or unstressed position and the lips 129 extend over at least a portion of the engagement surface 221 to hold the sealing member 216 in place against the retention surface 117 of the socket 118. The interference surface 223 prevents or inhibits rotation of the sealing member 216 relative to the socket 118. Additionally, in some embodiments, the tabs 218 radially extend past the retention tabs 119 to prevent or inhibit rotation of the sealing member 216.

In some embodiments, the sealing member 216 is formed from a rigid material, such as, for example and without limitation, steel or rigid plastic. In some embodiments, the sealing member 216 includes an integrated sealing surface 124 formed from a flexible material, such as, for example and without limitation, a rubber or flexible plastic material.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A windshield wiper assembly, comprising:
   a first link;
   a second link; and
   a ball and socket joint assembly connecting the first link and the second link, the joint assembly comprising
      a ball comprising a stud head and a shank;
      a socket comprising a cavity having an opening configured to receive the stud head, a retention surface surrounding the opening, and a plurality of retention tabs, each of the plurality of retention tabs including a lip that extends inwardly over a portion of the retention surface to form an opening between the lip and the retention surface; and
      a sealing member comprising a plate portion extending over the opening of the socket cavity and configured to retain the ball within the socket, said plate portion having at least one engagement surface that, in use, a portion of the at least one engagement surface is positioned in the opening between the lip and the retention surface hold the sealing member in place against the retention surface of the socket.

2. The windshield wiper assembly of claim 1, wherein the at least one engagement surface extends around the entire periphery of the sealing member.

3. The windshield wiper assembly of claim 1, wherein the sealing member further comprises a first sealing surface defining an open space, the first sealing surface configured to interface with the ball.

4. The windshield wiper assembly of claim 3, wherein the sealing member further comprises a second sealing surface configured to interface with the retention surface of the socket.

5. The windshield wiper assembly of claim 4, wherein the first sealing surface defines a first plane and the second sealing surface defines a second plane substantially parallel to the first plane.

6. A ball and socket joint assembly, comprising:
a ball comprising a stud head and a shank;
a socket comprising a cavity having an opening configured to receive the stud head, a retention surface surrounding the opening, and a plurality of retention tabs, each of the plurality of retention tabs including a lip that extends inwardly over a portion of the retention surface; and
an interlocking member comprising a plate portion extending over the opening of the socket cavity and configured to retain the ball within the socket, said interlocking member having an engagement surface including a plurality of interlocking portions such that the interlocking member is configured to rotate such that the interlocking portions of the engagement surface pass underneath a corresponding lip each of the plurality of retention portions to achieve an interlocked position between the interlocking member and the socket and hold the interlocking member in place against the retention surface of the socket.

7. The ball and socket joint assembly of claim 6, wherein the interlocking member is a sealing member.

8. The ball and socket joint assembly of claim 7, wherein the sealing member comprises a first sealing surface defining an open space, the first sealing surface configured to interface with the ball.

9. The ball and socket joint assembly of claim 8, wherein the sealing member comprises a second sealing surface configured to interface with the retention surface of the socket.

10. The ball and socket joint assembly of claim 6, wherein the engagement surface extends at least partially around a periphery of the interlocking member.

11. The ball and socket joint assembly of claim 6, wherein the interlocking portion comprises an interference surface and a ramped surface.

12. The ball and socket joint assembly of claim 6, wherein the interlocked position is achieved by rotation of the interlocking member with respect to the socket.

13. The ball and socket joint assembly of claim 6, wherein the interlocking member comprises a first interlocking surface and a second interlocking surface, both of the first and second interlocking surfaces at least partially surrounding a sealing surface, the first interlocking surface being located substantially in a first plane and the second interlocking surface having at least a portion that extends substantially perpendicular to the first interlocking surface.

14. The ball and socket joint of claim 13, wherein the interlocking member further comprises a plurality of notches in the engagement surface.

* * * * *